(12) United States Patent
Takemoto et al.

(10) Patent No.: US 8,937,751 B2
(45) Date of Patent: Jan. 20, 2015

(54) IMAGE EVALUATING APPARATUS, IMAGE EVALUATING METHOD, AND NON-TRANSITORY STORAGE MEDIUM

(71) Applicant: FUJIFILM Corporation, Tokyo (JP)

(72) Inventors: Fumito Takemoto, Ashigarakami-gun (JP); Toshiki Inoue, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 58 days.

(21) Appl. No.: 13/730,572

(22) Filed: Dec. 28, 2012

(65) Prior Publication Data

US 2013/0194637 A1 Aug. 1, 2013

(30) Foreign Application Priority Data

Jan. 31, 2012 (JP) .................. 2012-018935

(51) Int. Cl.
| | | |
|---|---|---|
| *B41C 1/04* | (2006.01) | |
| *B41C 1/00* | (2006.01) | |
| *G06K 15/02* | (2006.01) | |
| *H04N 1/40* | (2006.01) | |
| *B41F 33/00* | (2006.01) | |

(52) U.S. Cl.
CPC ............... *B41C 1/00* (2013.01); *G06K 15/027* (2013.01); *H04N 1/40* (2013.01); *G06K 15/025* (2013.01); *B41F 33/0081* (2013.01)
USPC ............ 358/3.29; 358/1.9; 358/504; 358/515

(58) Field of Classification Search
None
See application file for complete search history.

(56) References Cited

U.S. PATENT DOCUMENTS

| | | | | |
|---|---|---|---|---|
| 4,463,373 A | * | 7/1984 | Mikami ..................... | 358/527 |
| 5,608,496 A | * | 3/1997 | Hanzawa et al. ............. | 399/81 |
| 6,618,170 B1 | * | 9/2003 | Whiting et al. ............. | 358/1.9 |
| 6,729,239 B2 | * | 5/2004 | Edamitsu et al. ............ | 101/485 |
| 8,159,725 B2 | * | 4/2012 | Cummings et al. .......... | 358/3.29 |
| 8,223,385 B2 | * | 7/2012 | Minhas ..................... | 358/1.18 |
| 8,530,540 B2 | | 9/2013 | Kodama | |
| 2003/0090689 A1 | * | 5/2003 | Klassen ..................... | 358/1.9 |
| 2007/0181027 A1 | * | 8/2007 | Kanazawa .................. | 101/484 |
| 2008/0030787 A1 | * | 2/2008 | McElvain ................... | 358/3.26 |

(Continued)

FOREIGN PATENT DOCUMENTS

| | | |
|---|---|---|
| JP | 7-137234 A | 5/1995 |
| JP | 7-175933 A | 7/1995 |

(Continued)

OTHER PUBLICATIONS

Office Action for Japanese Application No. 2012-018935, dated Nov. 12, 2013, including a partial English translation.

*Primary Examiner* — Dung Tran
(74) *Attorney, Agent, or Firm* — Birch, Stewart, Kolasch & Birch, LLP (57) ABSTRACT

The present invention relates to an image evaluating apparatus, an image evaluating method, and a non-transitory storage medium. In the present invention, two-dimensional relative positions between the image formation position of one color plate of a plurality of color plates and the image formation positions of other color plates are calculated based on known positional information of registration marks formed by the color plates and positional information of the registration marks that are actually formed as images on a recording medium. A position expressing image is generated which represents the calculated relative positions by way of two-dimensional positional coordinates.

7 Claims, 7 Drawing Sheets

(56) References Cited

U.S. PATENT DOCUMENTS

2009/0207428 A1* 8/2009 Tanimoto et al. .............. 358/1.9
2010/0009287 A1 1/2010 Kodama
2011/0255138 A1* 10/2011 Calamita ....................... 358/515

FOREIGN PATENT DOCUMENTS

| | | |
|---|---|---|
| JP | 2000-127353 A | 5/2000 |
| JP | 2004-286684 A | 10/2004 |
| JP | 2005-223515 A | 8/2005 |

* cited by examiner

IMAGE EVALUATING APPARATUS, IMAGE EVALUATING METHOD, AND NON-TRANSITORY STORAGE MEDIUM

CROSS-REFERENCE TO RELATED APPLICATION

This application is based upon and claims the benefit of priority from Japanese Patent Application No. 2012-018935 filed on Jan. 31, 2012, the contents of which are incorporated herein by reference.

BACKGROUND OF THE INVENTION

1. Field of the Invention

The present invention relates to an image evaluating apparatus, an image evaluating method, and a non-transitory storage medium for evaluating the extent of a misregistration that has occurred in an image produced by a plurality of color plates.

2. Description of the Related Art

Heretofore, there have been proposed various methods of measuring positional shifts of registration marks that are actually printed and adjusting the positions of a plurality of color plates based on the measured positional shifts in order to prevent an image deficiency caused by a relative positional shift, so-called misregistration, between the color plates.

Japanese Laid-Open Patent Publication No. 2004-286684 discloses an apparatus for and a method of reading a digital image of a chart which comprises parallel lines in different colors that are spaced at given intervals and measuring registration shifts of color plates based on the read digital image. The registration shifts of the color plates are made visual by displaying, on a monitor screen, a graph that is representative of shifts of lines on the color plates with respect to line numbers (positions) (see paragraphs [0054] through [0056], FIG. 6 of Japanese Laid-Open Patent Publication No. 2004-286684).

SUMMARY OF THE INVENTION

A misregistration is often detected not as a one-dimensional shift, but as a two-dimensional shift. The extent of a misregistration that has occurred on a recording medium may vary from position to position on the recording medium because only part of the color plates used is tilted.

The graph displayed on the monitor screen as disclosed in Japanese Laid-Open Patent Publication No. 2004-286684 only represents a one-dimensional shift along a certain direction, thereby leaving the operator unable to instinctively understand which color plate is shifted along which direction to what extent.

It is an object of the present invention to provide an image evaluating apparatus, an image evaluating method, and a non-transitory storage medium which allow the operator to grasp the extent of a misregistration that has occurred at first glance.

According to the present invention, there is provided an image evaluating apparatus comprising a relative position calculator for calculating two-dimensional relative positions between the image formation position of one color plate of a plurality of color plates and the image formation positions of other color plates, based on known positional information of registration marks formed by the color plates and positional information of the registration marks that are actually formed as images on a recording medium, and a position expressing image generator for generating a position expressing image which represents the relative positions calculated by the relative position calculator, by way of two-dimensional positional coordinates.

As the image evaluating apparatus includes the position expressing image generator which generates the position expressing image that are representative of the two-dimensional relative positions between the image formation position of the one color plate and the image formation positions of the other color plates, by way of the two-dimensional positional coordinates, the operator is able to instinctively understand which color plate is shifted along which direction to what extent, and hence to grasp, at a glance, the extent of a misregistration.

The position expressing image generator should preferably generate the position expressing image which is expressed by vectors having a common starting point at the image formation position of the one color plate and ending points at the relative positions of the other color plates. The operator is thus able to more instinctively grasp relative shifts of the color plates based on the sizes and directions of the vectors.

The position expressing image generator should preferably generate the position expressing image which includes frames expressing the image formation position of the one color plate and the relative positions of the other color plates. The operator is thus able to easily grasp relative shifts of the color plates on an overall recording medium based on the intersecting angles, corner positions, etc. of the frames.

The position expressing image generator should preferably generate the position expressing image wherein given areas on the frames and remaining areas on the frames are displayed at different size ratios.

The position expressing image generator should preferably generate the position expressing image which expresses the relative positions using colors corresponding to the color plates.

The position expressing image generator should preferably generate the position expressing image which includes a graduated image representing actual sizes of the relative positions.

The image evaluating apparatus should preferably further comprise a display unit for displaying the position expressing image which is generated by the position expressing image generator.

According to the present invention, there is also provided an image evaluating method for enabling a computer to perform the steps of calculating two-dimensional relative positions between the image formation position of one color plate of a plurality of color plates and the image formation positions of other color plates, based on known positional information of registration marks formed by the color plates and positional information of the registration marks that are actually formed as images on a recording medium, and generating a position expressing image which represents the calculated relative positions by way of two-dimensional positional coordinates.

According to the present invention, there is further provided a non-transitory storage medium storing a program for enabling a computer to perform the steps of calculating two-dimensional relative positions between the image formation position of one color plate of a plurality of color plates and the image formation positions of other color plates, based on known positional information of registration marks formed by the color plates and positional information of the registration marks that are actually formed as images on a recording medium, and generating a position expressing image which represents the calculated relative positions by way of two-dimensional positional coordinates.

With the image evaluating apparatus, the image evaluating method, and the non-transitory storage medium according to the present invention, since the position expressing image that expresses the two-dimensional relative positions between the image formation position of the one color plate and the image formation positions of the other color plates by way of the two-dimensional positional coordinates is generated, the operator is able to instinctively understand which color plate is shifted along which direction to what extent, and hence to grasp, at a glance, the extent of a misregistration.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

An image evaluating method according to a preferred embodiment of the present invention in relation to an image evaluating apparatus for carrying out the image evaluating method will be described in detail below with reference to the accompanying drawings. The formation of an image will also be referred to as printing hereinbelow.

Figure 1:
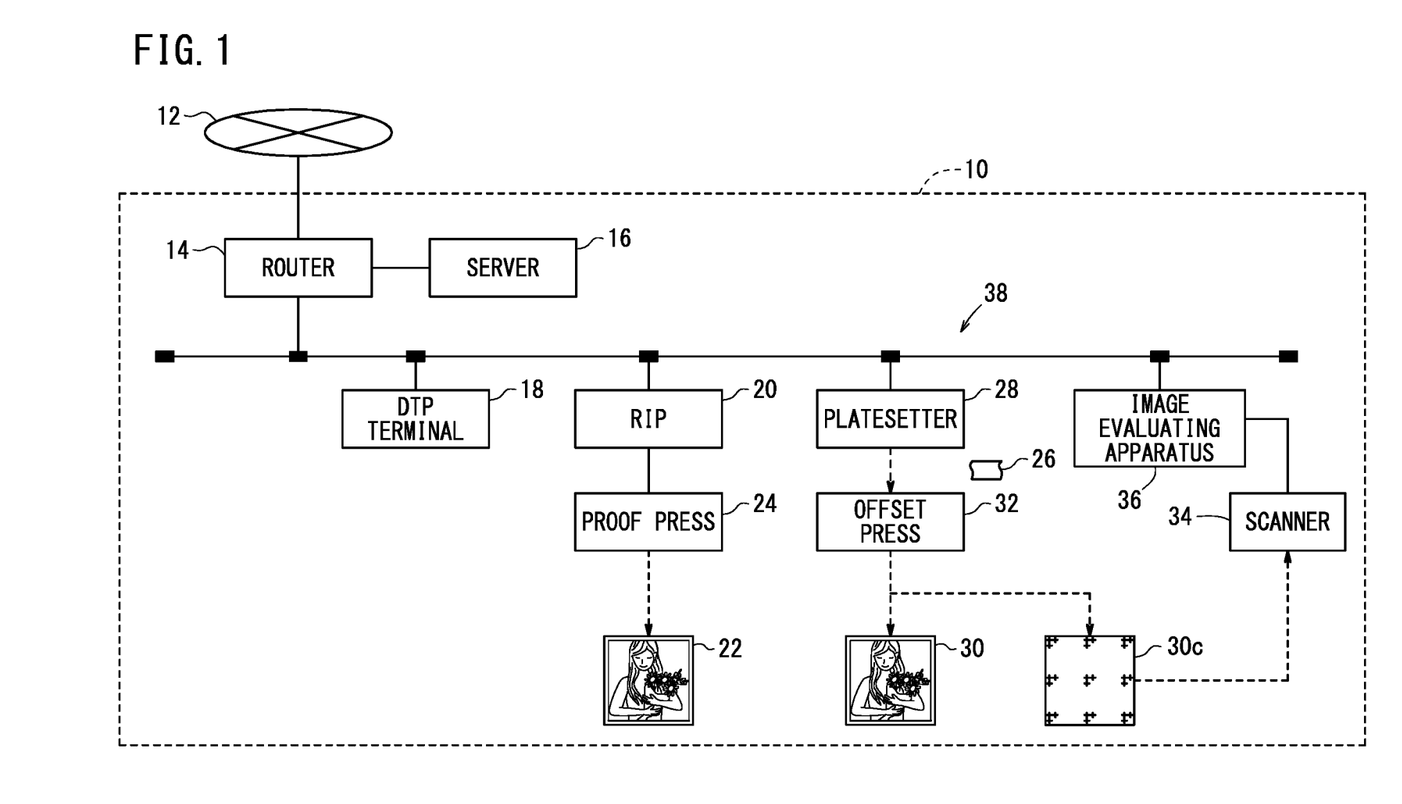
FIG. 1 is a block diagram of a print production system incorporating an image evaluating apparatus according to an embodiment of the present invention.

FIG. 1 is a block diagram of a print production system 10 incorporating an image evaluating apparatus 36 according to an embodiment of the present invention.

As shown in FIG. 1, the print production system 10 includes a router 14 serving as a device for connection the print production system 10 to a network 12, a server 16 accessible through the network 12 from terminal devices, not shown, that belong to external networks, a DTP (Desktop Publishing) terminal 18 for performing a DTP process including a process of editing contents data acquired from the server 16 or the like, an RIP (Raster Image Processor) 20 for performing various image processing processes such as a rasterizing process, a color conversion process, etc. based on proofread data or platemaking data generated by the DTP terminal 18, a proof press 24 for printing a proof 22 based on processed proofread data sent from the RIP 20, a platesetter 28 for producing printing plates 26 based on platemaking data sent from the RIP 20, an offset press 32 for printing a print 30 {including a registration chart (hereinafter referred to as "chart 30c")} with printing plates 26 that are mounted in the offset press 32, and an image evaluating apparatus 36 for evaluating an image configuration of the chart 30c based on image data read by a scanner 34.

The server 16 is a core device for work flow management in the print production system 10. The server 16 is connected for communication with terminal devices of designers and/or production companies, not shown, through the router 14 and the network 12. The server 16 is also connected for communication with the DTP terminal 18, the RIP 20, the platesetter 28, and the image evaluating apparatus 36 through a LAN (Local Area Network) 38 that is constructed in the print production system 10.

The server 16 is adapted to perform a function as a file server for storing and transferring various data files, a function as an authority management server for managing task authorities that can be carried out by terminals, users, or printing jobs, and a function as a mail server for generating and distributing notice mails at given timings such as the starting and ending of various processes. The various data files that can be managed by the server 16 as the file server include contents data files, proof data files, platemaking data files, job ticket files {e.g., JDF (Job Definition Format) files}, ICC (International Color Consortium) profiles, color sample data files, etc.

The DTP terminal 18 generates edited data per page from contents data representing characters, figures, patterns, pictures, etc. which have been processed by a preflight process. The DTP terminal 18 also performs an imposing process according to a binding process and a page folding process which have been designated, by referring to the tag information of a job ticket.

The RIP 20 functions as a print processing server for at least one printing press. In FIG. 1, the RIP 20 is connected for communication with the proof press 24 and the platesetter 28. The RIP 20 converts proof data (or platemaking data) described in a page description language into print data suitable for printing presses, and supplies the print data to the proof press 24 or the platesetter 28.

The proof press 24 prints a proof 22 based on the print data supplied from the RIP 20. The proof press 24 may comprise a DDCP (Direct Digital Color Proofer), an ink jet color proofer, a low-resolution color laser printer (electrophotographic printer), an ink jet printer, or the like.

The offset press 32 applies inks to a print medium (recording medium) through the printing plates 26 and intermediate transfer mediums, not shown, to produce a print 30. The offset press 32 may be replaced with a digital printing press for direct printing. The digital printing press may comprise an ink jet color proofer, color laser printer (electrophotographic printer), or the like.

Figure 2:
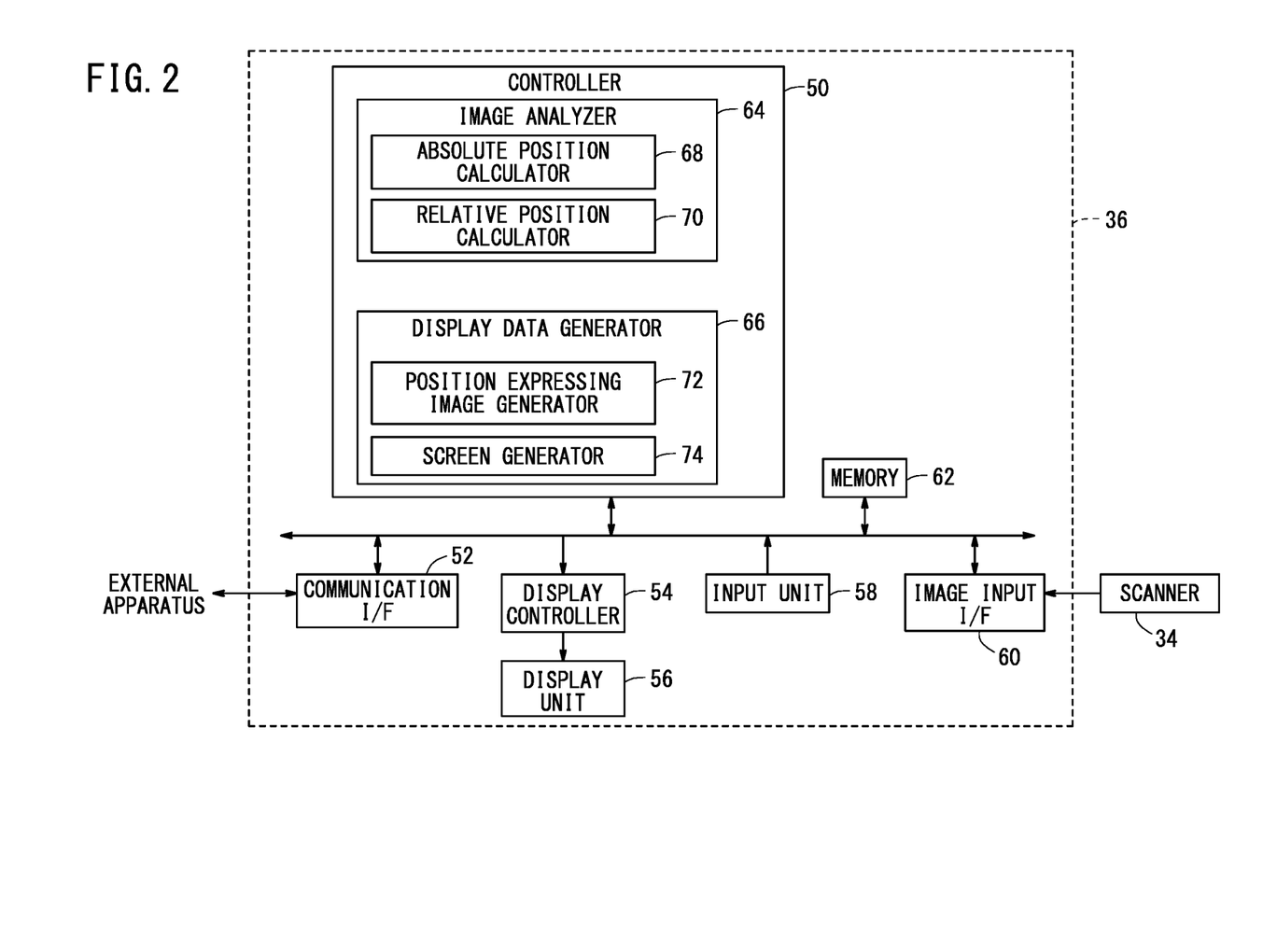
FIG. 2 is an electric block diagram of the image evaluating apparatus shown in FIG. 1.

FIG. 2 is an electric block diagram of the image evaluating apparatus 36 shown in FIG. 1.

The image evaluating apparatus 36 comprises a computer including a controller 50, a communication I/F 52, a display controller 54, a display unit 56, an input unit 58, an image input I/F 60, and a memory 62 (non-transitory storage medium).

The communication I/F 52 is an interface for sending electric signals to and receiving electric signals from external apparatus. For example, the communication I/F 52 can acquire various items of information such as proof data, platemaking data, printing condition data, ICC profiles, etc. that are managed and saved in the server 16 (see FIG. 1).

The display controller 54 comprises a control circuit for controlling the display unit 56 under the control of the controller 50. Specifically, the display controller 54 outputs a display control signal via an I/F, not shown, to the display unit

Figure 6:
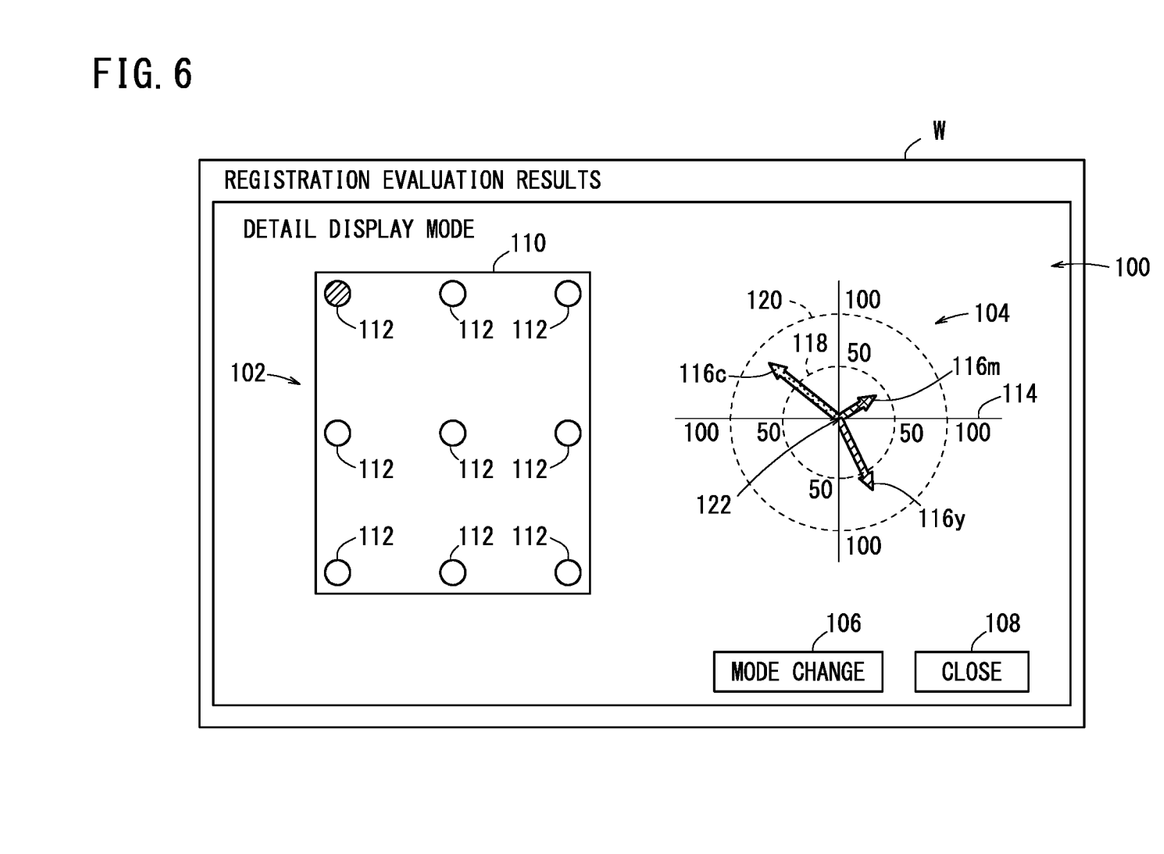
FIG. 6 is a view of a first image representing a result screen by way of example.
Figure 7:
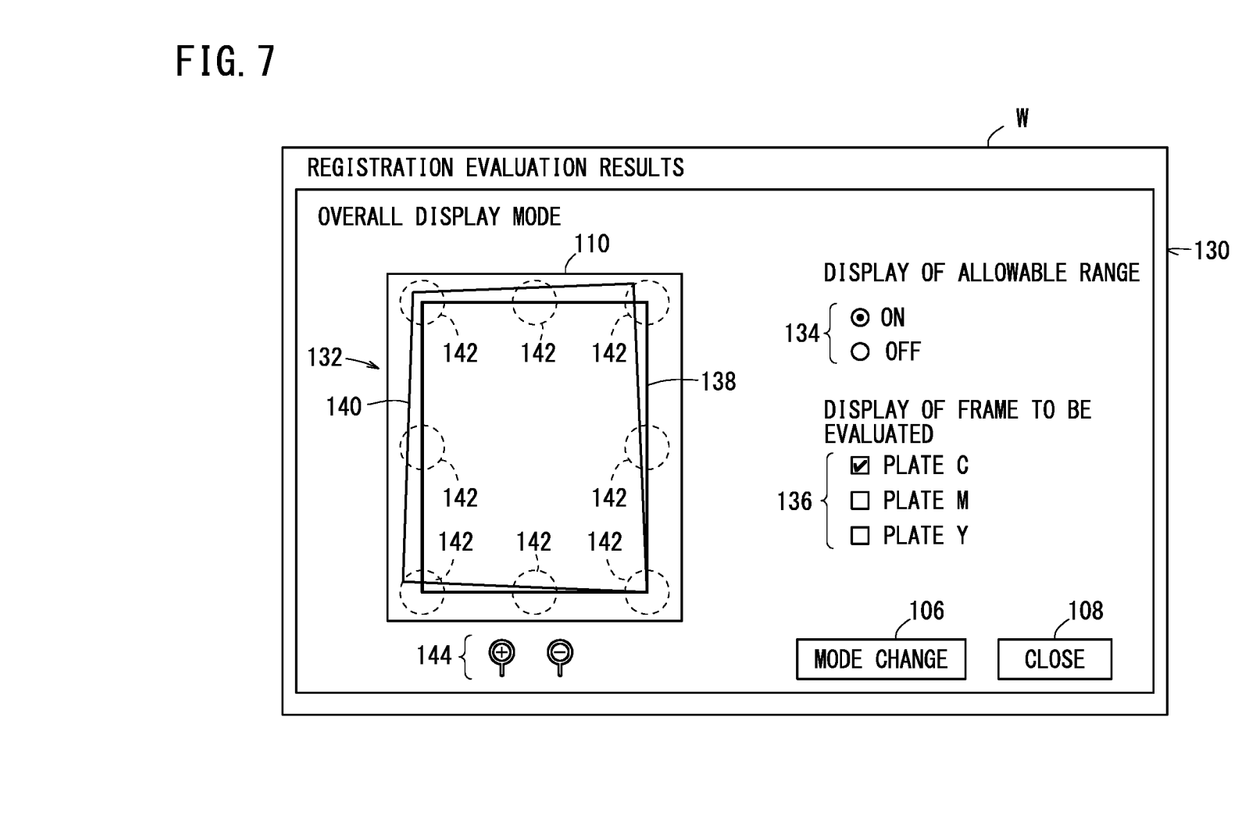
FIG. 7 is a view of a second image representing a result screen by way of example.

56, whereby the display unit 56 is energized to display various images including windows W shown in FIGS. 6 and 7.

The input unit 58 comprises various input devices including a mouse, a track ball, a keyboard, etc. The display function of the display unit 56 and the input function of the input unit 58 are used in combination as a user interface.

The image input I/F 60 is an interface for receiving image data read by the scanner 34. The scanner 34 may be a flatbed scanner for reading reflective documents or a film scanner for reading transmissive documents.

The memory 62 stores programs and data which are required for the controller 50 to control various components. The memory 62 may comprise a non-transitory, computer-readable recording medium such as a nonvolatile memory, a hard disk, or the like.

The controller 50 comprises a processor such as a CPU (Central Processing Unit) or the like. The controller 50 performs various functions as an image analyzer 64 and a display data generator 66 by reading and executing programs stored in the memory 62.

The image analyzer 64 analyzes the extent of a misregistration by performing known image processing processes on image data that represent a chart 30*c*. Specifically, the image analyzer 64 includes an absolute position calculator 68 for calculating the absolute positions of registration marks 82 (see FIG. 4A) in an image area, and a relative position calculator 70 for calculating two-dimensional relative positions between an image formation position of one color plate (e.g., a color plate K) and image formation positions of other color plates (e.g., color plates C, M, and Y).

The display data generator 66 includes a position expressing image generator 72 for generating an image (hereinafter referred to as "position expressing image") which expresses the relative positions calculated by the relative position calculator 70 on given two-dimensional position coordinates, and a screen generator 74 for generating a result screen 100 (see FIG. 6) and a result screen 130 (see FIG. 7) which are to be selectively displayed.

The image evaluating apparatus 36 according to the present embodiment is basically constructed as described above. Operation of the image evaluating apparatus 36 will be described in detail below with reference to a flowchart shown in FIG. 3.

Figure 3:
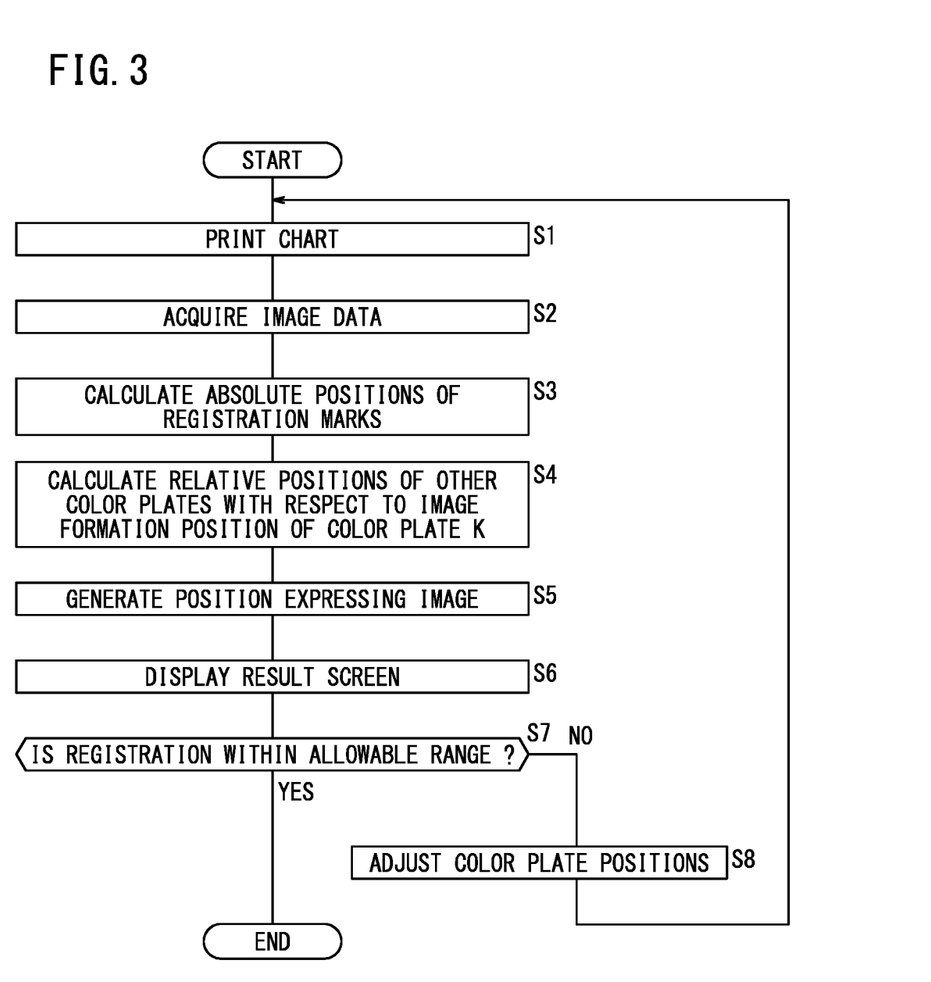
FIG. 3 is a flowchart of an operation sequence of the image evaluating apparatus shown in FIGS. 1 and 2.

In step S1 shown in FIG. 3, the chart 30*c* is printed using the offset press 32. C, M, Y, K (four color plates) will mainly be described hereinbelow as the colors in which to print the chart 30*c*. However, the chart 30*c* may be printed in any desired types of color plates and any number of color plates. For example, the standard inks in C (cyan), M (magenta), Y (yellow), K (black) and other optional inks in pale colors such as LC (light cyan), LM (light magenta), etc. and W (white) may be combined with each other as the colors in which to print the chart 30*c*.

Figure 4A:
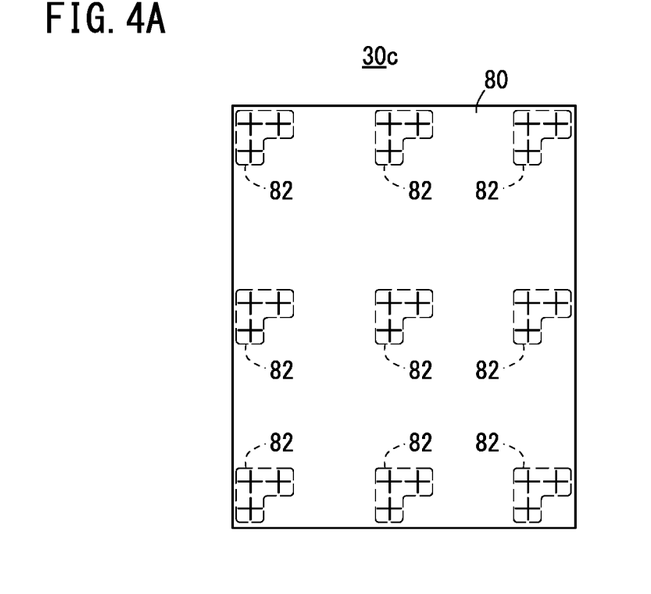
FIG. 4A is a front elevational view of the chart shown in FIG. 1.
Figure 4B:
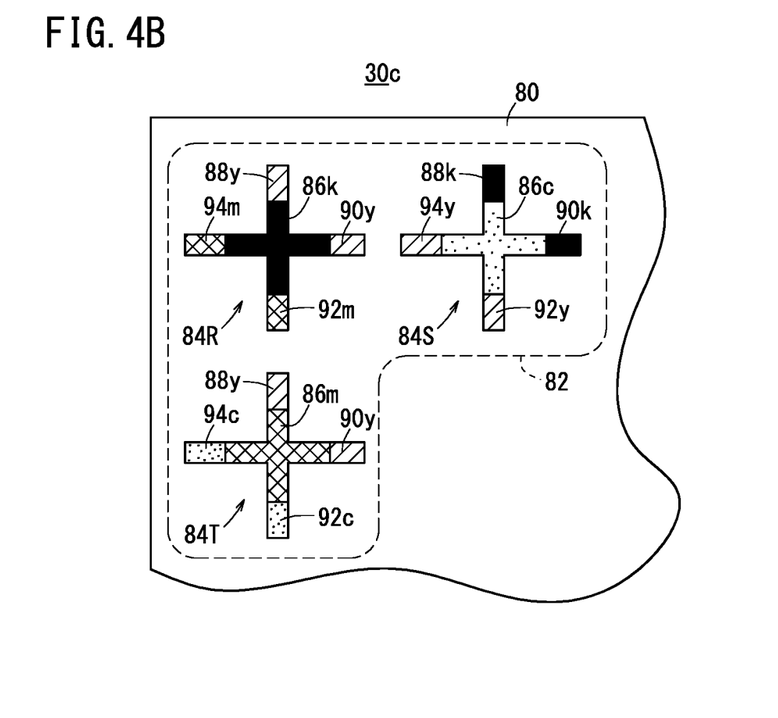
FIG. 4B is an enlarged fragmentary front elevational view of the chart shown in FIG. 4A.

FIG. 4A is a front elevational view of the chart 30*c* shown in FIG. 1, and FIG. 4B is an enlarged fragmentary front elevational view of the chart 30*c* shown in FIG. 4A, more specifically, an enlarged fragmentary front elevational view of an upper left corner of the chart 30*c* shown in FIG. 4A.

As shown in FIG. 4A, the chart 30*c* includes nine registration marks 82 printed on a sheet 80 as a recording medium. The nine registration marks 82 are disposed at the four corners of the sheet 80, at positions between the corners, and at the center of the sheet 80. Each of the registration marks 82 comprises three crisscross marks (hereinafter referred to as "unit marks 84R, 84S, 84T").

As shown in FIG. 4B, the unit marks 84R, 84S, 84T include an image area shown as stippled which is formed in the color C alone, an image area shown as cross-hatched which is formed in the color M alone, an image areas shown as hatched which is formed in the color Y alone, and an image area shown as solid black which is formed in the color K.

The unit mark 84R is made up of a crisscross mark element 86*k* in the color K, rectangular mark elements 88*y*, 90*y* in the color Y, and rectangular mark elements 92*m*, 94*m* in the color M. The unit mark 84S is made up of a crisscross mark element 86*c* in the color C, rectangular mark elements 88*k*, 90*k* in the color K, and rectangular mark elements 92*y*, 94*y* in the color Y. The unit mark 84T is made up of a crisscross mark element 86*m* in the color M, rectangular mark elements 88*y*, 90*y* in the color y, and rectangular mark elements 92*c*, 94*c* in the color C.

The registration marks 82 are not limited to those shown in FIGS. 4A and 4B, but may have any patterns that allow extents of misregistrations to be measured.

In step S2, the image evaluating apparatus 36 acquires image data representative of the chart 30*c*. Specifically, the scanner 34 reads the image of the chart 30*c* that is set in a predetermined state, and supplies obtained image data to the image evaluating apparatus 36. The controller 50 of the image evaluating apparatus 36 acquires the image data via the image input I/F 60 and temporarily stores the acquired image data in the memory 62. Incidentally, the image data acquiring means or acquiring route is not limited to the above embodiment. The image data may be acquired by any desired means and through any desired routes. For example, the image data may be read by another scanner, not shown, and temporarily be stored in the server 16, and the image evaluating apparatus 36 may acquire the image data from the server 16 through the router 14, the LAN 38, and the communication I/F 52.

In step S3, based on the image data acquired in step S2, the absolute position calculator 68 calculates respective absolute positions of the registration marks 82 (see FIG. 4A) in the image area of the image data. Various items of information of the registration marks 82 have been stored in advance in the memory 62, and ideal shapes and colors of the unit marks 84R, 84S, 84T are known. Thus, the absolute position calculator 68 can calculate the absolute positions using a known image analyzing process.

Figure 5:
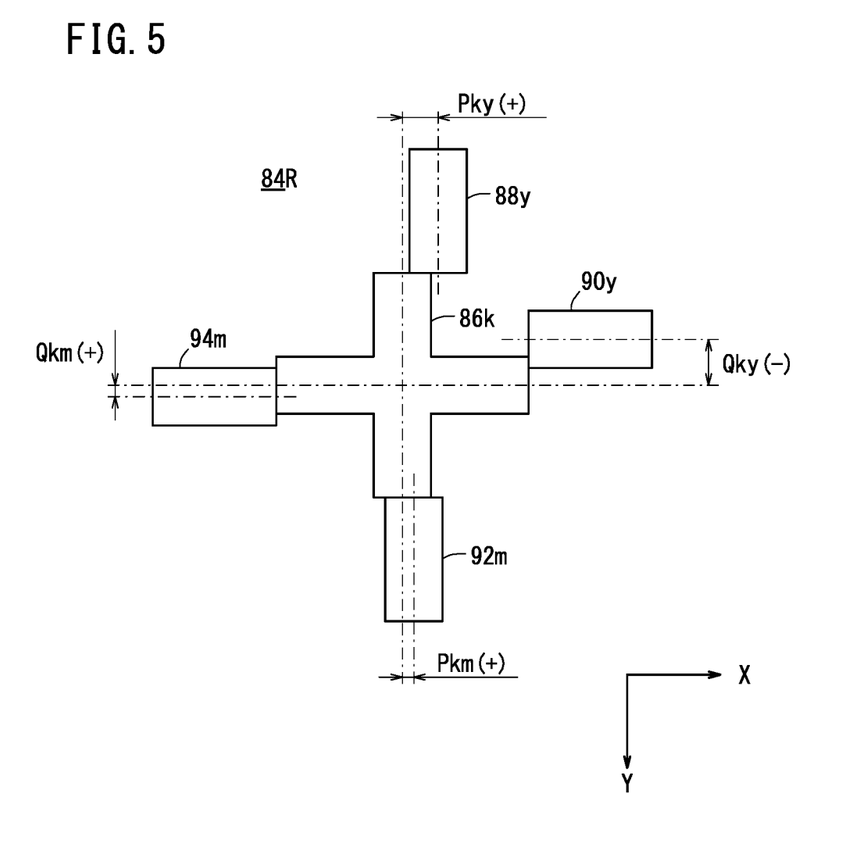
FIG. 5 is a view which is illustrative of a process of calculating registration shifts.

FIG. 5 is a view which is illustrative of a process of calculating registration shifts. FIG. 5 specifically shows an actual plotted example of the unit mark 84R of the registration mark 82 shown in FIG. 4B. If no misregistration occurs, then perfect crisscross marks are formed as shown in FIG. 4B. However, if images by the respective color plates are formed in relatively shifted positions, then the unit mark 84R is formed as shown in FIG. 5, for example. For illustrative purposes, only the contours of the mark elements 86*k*, 88*y*, 90*y*, 92*m*, 94*m* are shown in FIG. 5.

The absolute position calculator 68 identifies the positions of central axes of line elements, i.e., the mark elements, and calculates the identified positions as image formation positions (coordinates), according to a known algorithm. Specifically, the absolute position calculator 68 calculates the positions (X coordinates) of central vertical lines of the mark elements 86*k*, 88*y*, 92*m*, and calculates the positions (Y coordinates) of central horizontal lines of the mark elements 86*k*, 90*y*, 94*m*.

In step S4, the relative position calculator 70 calculates relative positions of the color plates using the absolute positions calculated in step S3. Positional information and colors of the mark elements 86*k*, 88*y*, 90*y*, 92*m*, 94*m* are known. Thus, the relative position calculator 70 can calculates the relative positions of the color plates by referring to the known positional information (relative positional relationship).

Specifically, the relative position calculator 70 subtracts the X coordinate of the mark element 86k (vertical line) from the X coordinate of the mark element 88y to calculate a relative position (X-axis component Pky: positive) of the color plate Y with respect to the color plate K. The relative position calculator 70 subtracts the Y coordinate of the mark element 86k (horizontal line) from the Y coordinate of the mark element 90y to calculate a relative position (Y-axis component Qky: negative) of the color plate Y with respect to the color plate K. Similarly, the relative position calculator 70 calculates relative positions of the color plate M with respect to the color plate K, i.e., an X-axis component Pkm and a Y-axis component Qkm, from the positional relationship of the mark elements 92m, 94m with respect to the mark element 86k.

The relative position calculator 70 also performs the same calculations as described above on the other unit marks 84S, 84T to calculate relative positions of the color plates C, M, Y with respect to the color plate K in their image formation positions.

In step S5, the position expressing image generator 72 generates a position expressing image 104 (see FIG. 6) using the relative positions calculated in step S4. A specific form for making the position expressing image 104 visual will be described later.

In step S6, the display controller 54 controls the display unit 56 to display a window W (including a result screen 100). Before the window W is displayed, the screen generator 74 generates display data of the result screen 100 which includes the position expressing image 104, and supplies the generated display data to the display controller 54.

As shown in FIG. 6, the result screen 100 includes a simulated image 102 which simulates the chart 30c as viewed in plan, the position expressing image 104 generated by the position expressing image generator 72, a button 106 with the words "MODE CHANGE", and a button 108 with the word "CLOSE". If the "CLOSE" button 108 is clicked, the window W is closed, i.e., hidden.

The simulated image 102 is made up of a rectangular image 110 representing the shape of the sheet 80 (see FIG. 4A) and nine circular images 112 indicative of the respective positions of the registration marks 82.

As shown in FIG. 6, one of the circular images 112 which is located at the upper left corner of the rectangular image 110 is shown hatched, indicating that the circular image 112 in the "upper left" position is selected. The position expressing image 104 now makes visual the extent of a misregistration at the selected "upper left" position.

The position expressing image 104 comprises a crisscross line 114 indicative of two-dimensional positional coordinates, three arrow images 116c, 116m, 116y, and two concentric graduated circular lines 118, 120 (graduated images). The crisscross line 114 has a central intersection 122 representing the image formation position of the color plate K. The arrow images 116c, 116m, 116y represent the respective relative positions of the color plates C, M, Y with respect to the color plate K. In other words, the position expressing image 104 expresses the extent of a misregistration by vectors having a common starting point at the image formation position (intersection 122) of the color plate K and the respective ending points at the relative positions of the color plates C, M, Y. The operator who is viewing the position expressing image 104 is thus able to more instinctively grasp relative shifts of the color plates based on the sizes and directions of the vectors. Further, by comparing the positions of the starting points of the vectors, the operator can also grasp the relative positions between some of the color plates other than the color plate K, e.g., the color plates C and M.

If the arrow images 116c, 116m, 116y are displayed respectively in colors corresponding to the color plates with which images will actually be formed, then the operator can identify and recognize the shifts of the color plates with increased ease. The colors corresponding to the color plates refer to colors whose tendency is the same, e.g., whose saturation is identical or close, in various color systems.

A numeral "50" is displayed in positions near the graduated line 118, and a numeral "100" is displayed in positions near the graduated line 120. These numerals correspond to actual sizes of the relative positions expressed in a length unit "µm". The operator can grasp, at a glance, actual shifts of the color plates based on the positional relationship between the pointed ends of the arrow images 116c, 116m, 116y and the graduated lines 118, 120. The position expressing image 104 may include a certain indicator which explicitly or implicitly indicates a maximum allowable level for misregistration. In FIG. 6, the graduated line 120 displayed as the outermost circle indicates a maximum allowable level for misregistration.

In response to the clicking operation of the "MODE CHANGE" button 106, the position expressing image generator 72 generates a new position expressing image 132 (see FIG. 7) which is different in form from the position expressing image 104. The screen generator 74 generates display data of a result screen 130 which includes the position expressing image 132, and supplies the generated display data to the display controller 54. The result screen 100 that is presently displayed on the display unit 56 then changes to the new result screen 130.

As shown in FIG. 7, the result screen 130 includes the position expressing image 132 generated by the position expressing image generator 72, two radio buttons 134, three check boxes 136, the button 106 with the words "MODE CHANGE", and the button 108 with the word "CLOSE". In response to the clicking operation of the "MODE CHANGE" button 106, the window W returns from the result screen 130 to the result screen 100 shown in FIG. 6.

The position expressing image 132 is made up of the rectangular image 110 representing the shape of the sheet 80 (see FIG. 4A), a frame image 138 (indicated by the thick lines) in the color K, a frame image 140 in the color C, and eight circular images 142 indicative of the respective positions of the registration marks 82 except the central registration mark 82. The frame image 138 indicates the profile of the image formation position of the color plate K. The frame image 138 represents a perfect rectangular frame similar to the rectangular shape of the rectangular image 110, and is disposed within the rectangular image 110 in the same direction as the rectangular image 110.

The frame image 140 indicates the profile of the image formation position of the color plate C, which corresponds to the profile of the image formation position of the color plate K. If the image formation position of the color plate C is distorted, then the frame image 140 represents a rectangular frame which is slightly distorted compared with the ideal rectangular shape. Therefore, the position expressing image 132 expresses the extent of a misregistration by the frame representing the image formation position of the color plate K and the frames representing the image formation positions of the color plates C, M, Y relative to the image formation position color plate K. The operator is thus able to easily grasp relative shifts of the color plates on the overall sheet 80 based on the intersecting angles, corner positions, etc. of the frames.

Since the actual shifts are up to a maximum of about 1 mm, it is difficult for the operator to visually recognize the shifts of images on the screen even though the position expressing image 132 is generated at a dimensional ratio commensurate with the actual dimensions of the chart 30c. Consequently, the relative positions of the color plates may be highlighted or emphasized by an image processing means which scales up or down image details in the circular images 142. According to the image processing means, the position expressing image generator 72 generates a position expressing image 132 wherein given areas (circular images 142) on the frames (frame images 138, 140) and remaining areas on the frames are displayed at different size ratios, thereby allowing the operator to simultaneously grasp the relative relationship between the shifts of the color plates not only on the overall sheet 80 but also at eight regions of interest, i.e., the circular images 142. Further, the operator may designate desired image magnification ratios in the areas of the circular images 142 by clicking icons 144 that are displayed beneath the position expressing image 132.

If the operator selects the radio buttons 134 indicating "ON" and "OFF", then the circular images 142 are displayed and not displayed, respectively. If the operator ticks or unticks the check boxes 136 indicating "COLOR PLATE C", "COLOR PLATE M", "COLOR PLATE Y", then the frame images 140 of the color plates to be evaluated, i.e., the frame images 140 of the color plates other than the color plates K, are independently and selectively displayed or not displayed.

In step S7, the operator judges whether the registration of the chart 30c is in an allowable range or not. If the operator judges that the registration of the chart 30c is in the allowable range, then the operator starts an actual printing process using the offset press 32. If the operator judges that the registration of the chart 30c is not in the allowable range, then control goes to step S8.

In step S8, the operator positionally adjusts the color plates by referring to the image information acquired by the image evaluating apparatus 36. After the positional adjustment is completed, control goes back to step S1, and steps S1 through S8 are repeated until the registration of the chart 30c falls within the allowable range.

As described above, the controller 50 of the image evaluating apparatus 36 includes the relative position calculator 70 for calculating two-dimensional relative positions between the image formation position of one color plate (color plate K) of a plurality of color plates and the image formation positions of other color plates (color plates C, M, Y), based on the known positional information of the registration marks 82 formed by the color plates (color plates C, M, Y, K) and the positional information of the registration marks 82 that are actually formed as images on the sheet 80, and the position expressing image generator 72 for generating the position expressing images 104, 132 which represent the calculated relative positions in two-dimensional positional coordinates. The operator is able to instinctively understand which color plate is shifted along which direction to what extent, and hence to grasp, at a glance, the extent of a misregistration.

Although certain preferred embodiments of the present invention have been shown and described in detail, it should be understood that various changes and modifications may be made therein without departing from the scope of the appended claims.

What is claimed is:

1. An image evaluating apparatus comprising:
    a relative position calculator for calculating two-dimensional relative positions between an image formation position of one color plate of a plurality of color plates and image formation positions of other color plates, based on known positional information of registration marks formed by the color plates and positional information of the registration marks that are actually formed as images on a recording medium; and
    a position expressing image generator for generating a position expressing image which represents the relative positions calculated by the relative position calculator, by way of two-dimensional positional coordinates,
    wherein the position expressing image generator generates the position expressing image which is concurrently expressed by vectors having a common starting point at the image formation position of the one color plate and ending points at the relative positions of the other color plates.

2. The image evaluating apparatus according to claim 1, wherein the position expressing image generator generates the position expressing image which expresses the relative positions using colors corresponding to the color plates.

3. The image evaluating apparatus according to claim 1, wherein the position expressing image generator generates the position expressing image which includes a graduated image representing actual sizes of the relative positions.

4. The image evaluating apparatus according to claim 3, wherein the position expressing image generator generates the position expressing image which includes, as the graduated image, a circular graduated line indicating a maximum allowable level for misregistration.

5. The image evaluating apparatus according to claim 1, further comprising:
    a display unit for displaying the position expressing image which is generated by the position expressing image generator.

6. A computer implemented image evaluating method performing the steps of:
    Calculating, by one or more processors, a two-dimensional relative positions between an image formation position of one color plate of a plurality of color plates and image formation positions of other color plates, based on known positional information of registration marks formed by the color plates and positional information of the registration marks that are actually formed as images on a recording medium; and
    Generating, by said one or more processors, a position expressing image which represents the calculated relative positions by way of two-dimensional positional coordinates,
    wherein the generated position expressing image is concurrently expressed by vectors having a common starting point at the image formation position of the one color plate and ending points at the relative positions of the other color plates.

7. A non-transitory storage medium storing a program for enabling a computer to perform the steps of:
    calculating two-dimensional relative positions between an image formation position of one color plate of a plurality of color plates and image formation positions of other color plates, based on known positional information of registration marks formed by the color plates and positional information of the registration marks that are actually formed as images on a recording medium; and
    generating a position expressing image which represents the calculated relative positions by way of two-dimensional positional coordinates,
    wherein the generated position expressing image is concurrently expressed by vectors having a common starting point at the image formation position of the one color plate and ending points at the relative positions of the other color plates.

* * * * *